US011150538B2

(12) United States Patent
Ueda

(10) Patent No.: US 11,150,538 B2
(45) Date of Patent: Oct. 19, 2021

(54) CAP

(71) Applicant: Ryoichi Ueda, Tokyo (JP)

(72) Inventor: Ryoichi Ueda, Tokyo (JP)

( * ) Notice: Subject to any disclaimer, the term of this patent is extended or adjusted under 35 U.S.C. 154(b) by 126 days.

(21) Appl. No.: 16/719,316

(22) Filed: Dec. 18, 2019

(65) Prior Publication Data

US 2020/0192188 A1 Jun. 18, 2020

Related U.S. Application Data

(63) Continuation of application No. PCT/JP2018/023452, filed on Jun. 20, 2018.

(30) Foreign Application Priority Data

Jun. 20, 2017 (JP) .............................. JP2017-120797

(51) Int. Cl.
*G03B 11/04* (2021.01)

(52) U.S. Cl.
CPC .................. *G03B 11/041* (2013.01)

(58) Field of Classification Search
USPC ....................................................... 324/448
See application file for complete search history.

(56) References Cited

U.S. PATENT DOCUMENTS

| 2,535,275 A * | 12/1950 | Dixon ................. E02D 29/1427 |
| | | 49/465 |
| 4,341,436 A * | 7/1982 | Kanno ................... G02B 23/16 |
| | | 220/326 |
| 6,047,999 A * | 4/2000 | Dixon, Jr. ............... E05B 63/18 |
| | | 292/32 |
| 2009/0086101 A1* | 4/2009 | Lee ....................... G03B 11/041 |
| | | 348/655 |
| 2009/0091827 A1* | 4/2009 | Gauger .................. G02B 23/16 |
| | | 359/511 |
| 2013/0287387 A1* | 10/2013 | Garber ................. G03B 11/043 |
| | | 396/448 |
| 2015/0253531 A1* | 9/2015 | Hayashi ................... G02B 7/02 |
| | | 359/511 |

(Continued)

FOREIGN PATENT DOCUMENTS

| EP | 2182409 A1 | 5/2010 |
| JP | 60-227236 A | 11/1985 |
| JP | 3007668 U | 2/1995 |

(Continued)

OTHER PUBLICATIONS

Extended Search Report for European Application No. 18820838.3 dated May 13, 2020.

(Continued)

*Primary Examiner* — Rodney E Fuller
(74) *Attorney, Agent, or Firm* — Harness, Dickey & Pierce, P.L.C.

(57) ABSTRACT

A cap attached to an article having an opening, the cap including a cap body and at least one locking member that is slidably attached inward and outward from a center and comes in press-contact with an inner circumferential surface of the article to be locked to the cap body, in which the locking member slidably engages with other locking members on both sides, slides inward toward the center, thereby pushes the other locking members inward, and releases the locking.

9 Claims, 10 Drawing Sheets

(56) References Cited

U.S. PATENT DOCUMENTS

2016/0257458 A1* 9/2016 Pentelovitch ........ B65D 45/327

FOREIGN PATENT DOCUMENTS

| JP | 2006-227118 A | 8/2006 |
|----|---------------|--------|
| JP | 2010-002807 A | 1/2010 |

OTHER PUBLICATIONS

Japanese Office Action dated Jan. 28, 2020 for corresponding Japanese Application No. 2019-525660.
International Search Report dated Sep. 11, 2018 in International Application No. PCT/JP2018/023452.
Office Action for Chinese Application No. 201880040654.3 dated Dec. 30, 2020 and English translation.

* cited by examiner

FIG. 6A
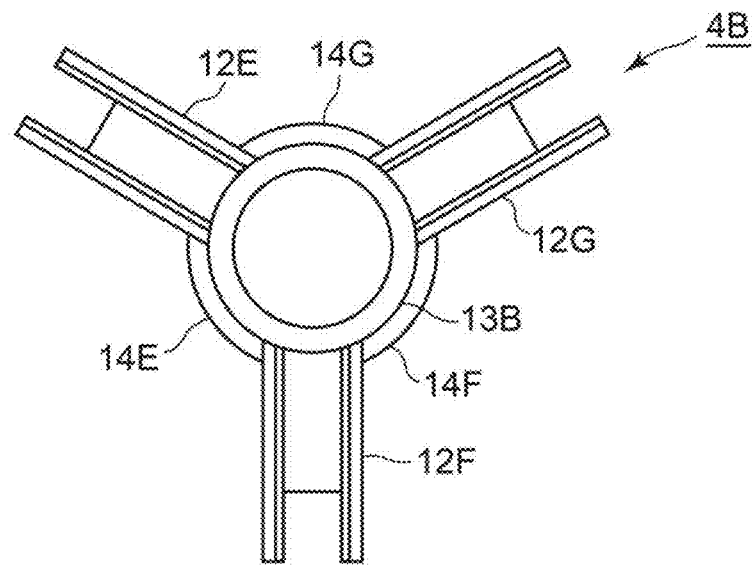
FIG. 6B
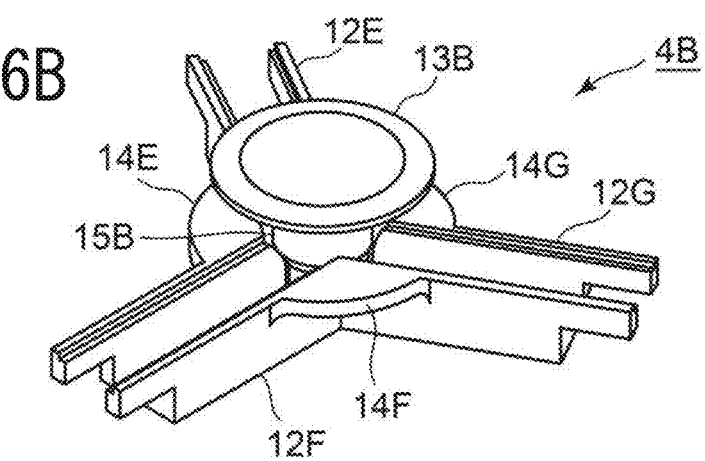
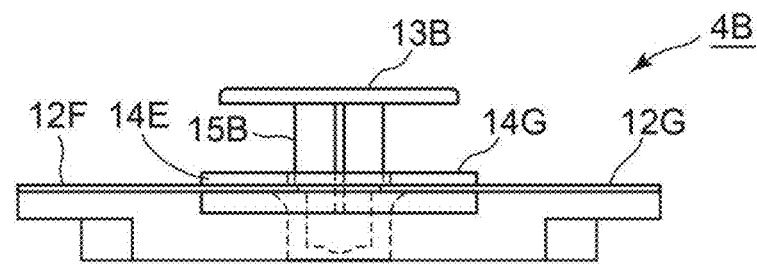
FIG. 6C

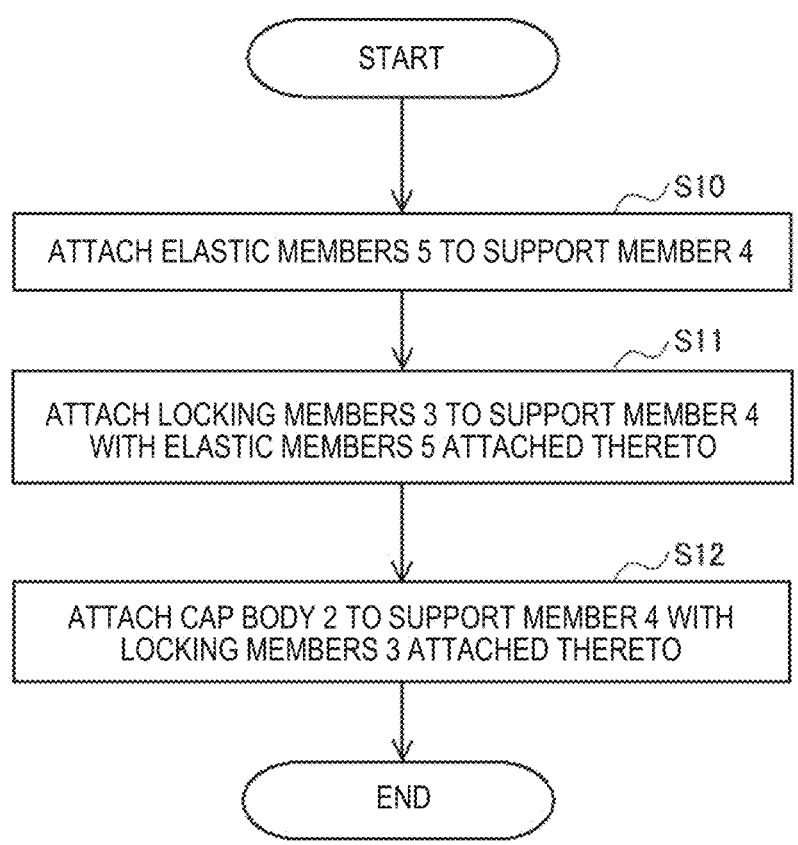

FIG. 10A
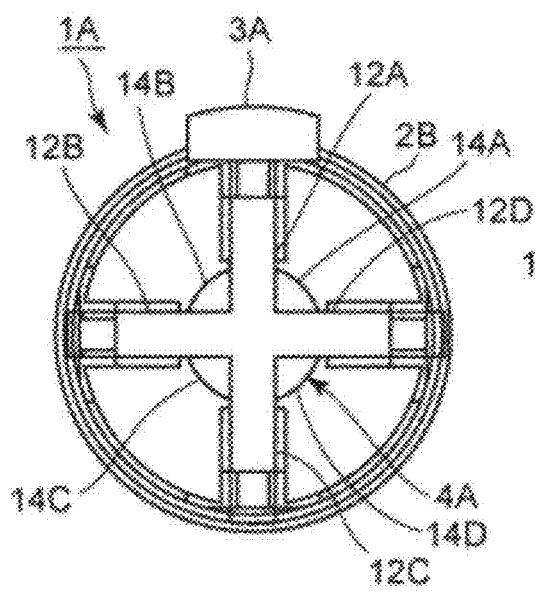
FIG. 10B
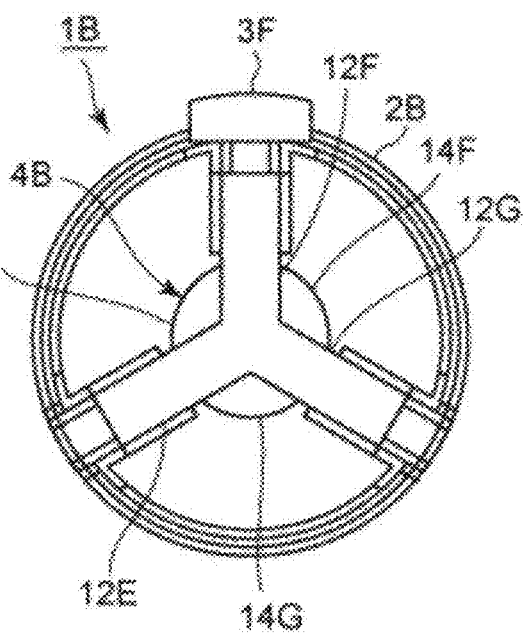
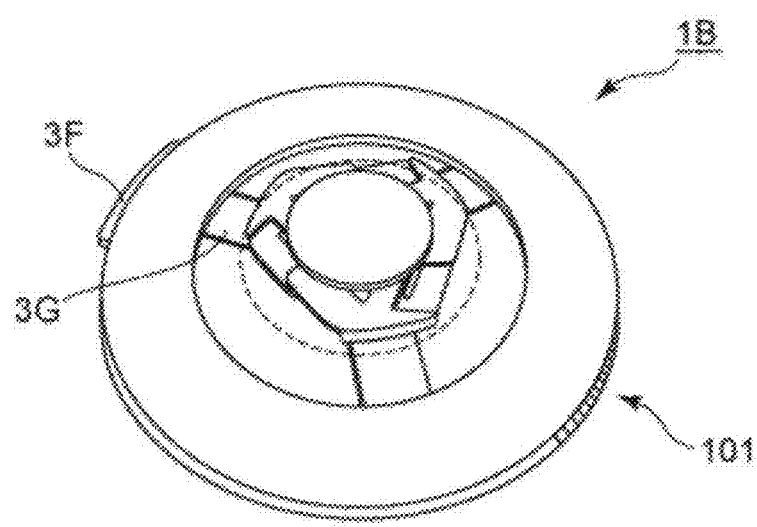
FIG. 10C

CAP

TECHNICAL FIELD

The present invention relates to a cap, particularly, a cap that can be removed by pinching two arbitrary points.

BACKGROUND ART

There is a detachable cap in the related art that can be mounted on an article by bringing the inner circumferential surface of an opening in pressure contact therewith using a biasing force of an elastic body applied outward and can be removed by releasing the pressurized contact.

For example, there is a cap for protecting the lenses in the lens barrel of a camera with a pair of locking members for locking the cap body in the lens barrel and an elastic body (e.g., a spring) biasing the locking member outward.

Patent Literature 1 discloses a lens cap with locking members mounted outward at two opposite locations of a plate-shaped cap member such that the locking members can slide.

In addition, Patent Literature 2 discloses a cap including a cap body attached to a component, a pair of movable members that are provided in the cap body and can move toward and away from each other, biasing members that bias the pair of movable members away from each other, and regulating means that regulate the movement of the pair of movable members away from each other against a biasing force of the biasing members.

CITATION LIST

Patent Literature

Patent Literature 1

Utility Model Registration No. 3007668

Patent Literature 2

Japanese Unexamined Patent Application Publication No. 2010-2807

SUMMARY OF INVENTION

Technical Problem

Here, such cap is required to be easy to remove in any state when the cap is removed from an article that the cap is mounted on.

However, in the device described in Patent Literature 1 and the invention described in Patent Literature 2, when the cap is gripped (e.g., pinched with two fingers) to remove the cap from a component on which the cap is mounted, the cap can be gripped only on a substantially straight line of the radial direction in which the biased pair of locking members or the movable members are arranged. In a case where such a cap is used as a lens cap of a camera, when someone attempts to remove the cap while holding the camera, it is hard to see the part to be gripped and the part is placed on the substantially straight line of the specific radial direction as described above, and thus in that state, it is difficult to remove the cap, resulting in insufficient convenience.

Therefore, the present invention aims to provide a cap that is convenient for removing a cap body from an article.

Solution to Problem

A cap according to the present invention is a cap attached to an article having an opening, and includes a cap body and at least one locking member that is attached to be capable of sliding inward and outward from a center and comes in press-contact with an inner circumferential surface of the article to be locked to the cap body, and the locking member slidably engages with other locking members on both sides, slides inward toward the center, thereby pushes the other locking members inward, and releases the locking.

Furthermore, the cap according to the present invention may include a plurality of the locking members, and the locking members may be disposed at equal angles around the center of the cap body.

Furthermore, the cap according to the present invention may include a support member having three or more groove parts extending outward from the center at equal angles, and at least some of the locking members may be fitted to any one of the three or more groove parts and slidably attached.

Furthermore, the cap according to the present invention may include an elastic member that is installed in the groove parts and biases the locking members outward from the center, and the locking members may come in press-contact with an inner circumferential surface of the article due to the biasing and lock the cap body.

Furthermore, in the cap according to the present invention, the cap body may have a circular opening at the center and three or more rectangular openings extending outward from the circular opening at equal angles.

Furthermore, in the cap according to the present invention, the locking member may have a first upper locking piece and a second upper locking piece forming two sides of a triangle gradually expanding toward the center, and a first lower locking piece and a second lower locking piece disposed to form steps with the first upper locking piece and the second upper locking piece respectively in the same direction, and cause locking pieces of the other locking members on both sides to engage with upper and lower gaps generated by the steps, and then the locking member may slide inward toward the center and push the other locking members inward.

Furthermore, the cap according to the present invention may be a lens cap mounted on camera lens glass or a mirror surface, or a lens barrel on a camera.

Advantageous Effects of Invention

A cap according to the present invention includes a cap body to be attached to an article and at least one locking member that is attached to be capable of sliding inward and outward from a center and locks the cap body by coming in press-contact with the article or sandwiches the article, and the locking member slidably engages with other locking members on both sides, slides inward toward the center, thereby pushes the other locking members inward, and releases the locking.

With this configuration, by pinching and pushing any two locking members among three or more locking members, that is, two arbitrary points, locking by press-contact with an article to which the locking members are attached is released, a cap body can thereby be removed from the article, and therefore convenience can be improved. In other words, the cap according to the present invention can improve convenience over a cap in the related art in terms of removal from an article on which it is mounted.

BRIEF DESCRIPTION OF DRAWINGS

FIG. 6A includes a plan view, FIG. 6B includes a perspective view, and FIG. 6C includes a front view illustrating an example of a support member according to the second embodiment.

FIG. 9 is a flowchart showing an example of an assembly procedure of a cap according to an embodiment.

FIG. 10A is an example of a bottom view of another cap. FIG. 10B is an example of a bottom view of another cap. FIG. 10C is an example of a perspective view of a cap.

DESCRIPTION OF EMBODIMENTS

A cap according to the present invention is a cap attached to an article to be protected and an object that covers a part of the article to be protected. The cap according to the present invention protects a protection target part of an article, specifically, for example, by covering the part to be protected by coming in contact with an opening of an article to plug the opening or covering the part to be protected by covering a tip of the article. An article to which a cap according to the present embodiment is attached may be any type of article as long as the cap body is attached to cover the article and is not limited to a specific article.

First Embodiment

A first embodiment will be described with reference to the drawings. The first embodiment is an example in which four locking members 3 are engaged with each other and thus a cap 1A is attached to an article at four points. Further, at least two locking members 3 of the cap according to the invention of the present application can be locked together, and two or more locking members 3 are engaged and locked with each other so that the cap can be attached to an article at two or more points. Although a cap of the related art is locked only at two points, it is desirable for the cap according to the present invention to have three or more locking points from the viewpoint of locking stability, and it is more advantageous for the number of locking members 3 (locking points) to be four (four points) than two (two points) in view of realization of stable locking.

Figure 1A:
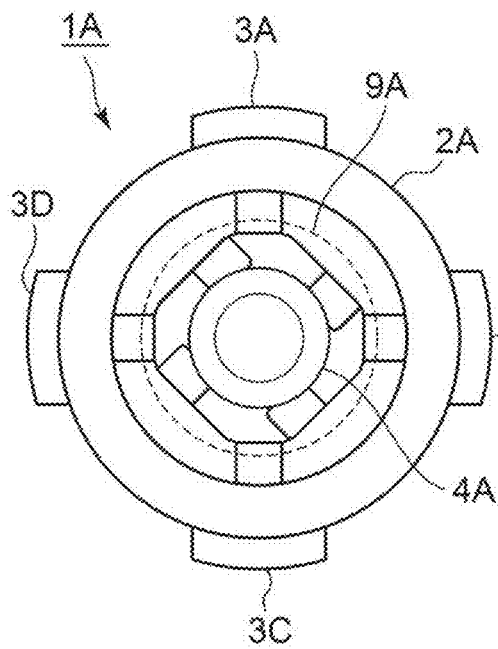
FIG. 1A is a plan view illustrating an example of a cap 1 according to a first embodiment.

FIG. 1A is a plan view for describing a cap 1A according to the first embodiment of the present invention. The cap 1A is a cap attached to an opening of an article (not illustrated) and, for example, is used by being attached to a tubular part to protect an object contained in the part from outside. Specifically, the cap 1A may be a lens cap mounted on a lens barrel of a camera, for example, or may be a lens cap mounted to cover a camera lens or a mirror surface. When the cap 1A is used as a lens cap, the cap is used by being attached to a lens barrel of a camera to protect the lens and the like from contamination and damage. In addition, the cap 1A may be, for example, a lid mounted on a cup. When the cap 1A is used as a lid of a cup, the cap may be used by being attached to the opening of the cup and protect a beverage contained in the cup. In addition, the cap 1A may be, for example, a lid mounted on a container.

Further, FIG. 1A illustrates a state of the locking members 3 projecting outward from a cap body 2A. In this posture, the cap 1A is attached to an article (not illustrated) (in other words, the locking members 3 are biased outward from the cap body 2A, in press-contact with an inner circumferential surface of the opening of the article, and thus lock the cap 1A).

As illustrated in FIG. 1A, the cap 1A is constituted by the cap body 2A, locking members 3A, 3B, 3C, and 3D (these locking members will be collectively referred to as "the locking members 3" as necessary), and a support member 4A. The cap body 2A, the locking members 3, and the support member 4 are made of, for example, a synthetic resin (PC/ABS, etc.), and elastic members 5 are made of, for example, a synthetic resin or a metal. Further, materials of these members are not limited thereto.

The locking members 3 are members for helping the cap body 2A attached to an article and for a pushing operation by serving as a knob 9A to be gripped by fingers when removed. As illustrated in FIG. 1A, the locking members 3A, 3B, 3C, and 3D are disposed to be centered on the cap body 2A at equal angles. Further, "the locking members 3A to 3D are disposed to be centered on the cap body 2A at equal angles" means that, when the locking members 3A to 3D are disposed with one ends thereof at the center, distances or angles between the adjacent locking members 3A to 3D are equal. The locking members 3A, 3B, 3C, and 3D are attached to be capable of sliding inward and outward from the center of the cap body 2A and locked to an inner circumferential surface of an opening of an article in press-contact, or the like. With this configuration, the cap 1A can be attached to the inner circumferential surface of the opening of the article at the four points of the locking members 3.

Figure 2A:
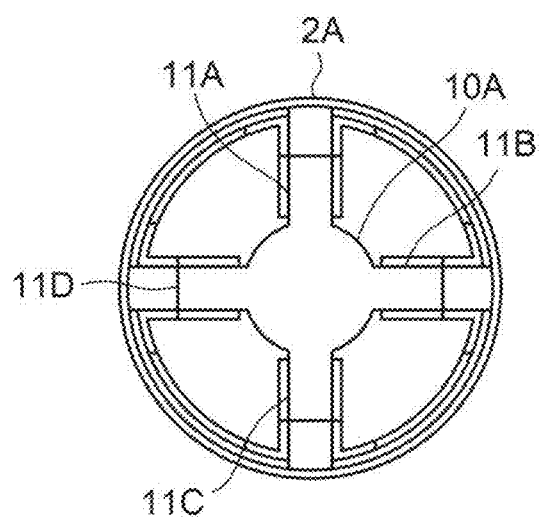
FIG. 2A is a bottom view illustrating an example of a cap body 2 according to the first embodiment.

The cap body 2A is, for example, a member for covering a part of an article to be protected by coming in contact with an opening of the article to plug the opening or covering a tip of the article. The cap body 2A is formed in, for example, a circular shape, and may be provided with a circular opening 10A at the center and rectangular openings 11A, 11B, 11C, and 11D extending outward from the circular opening 10A at equal angles as illustrated in FIG. 2A, and the cap body 2A may protrude with, for example, at least some of locking pieces of the four locking members 3A, 3B, 3C, and 3D disengaged from each other in the circular opening 10A as illustrated in FIG. 1A.

Figure 5A:
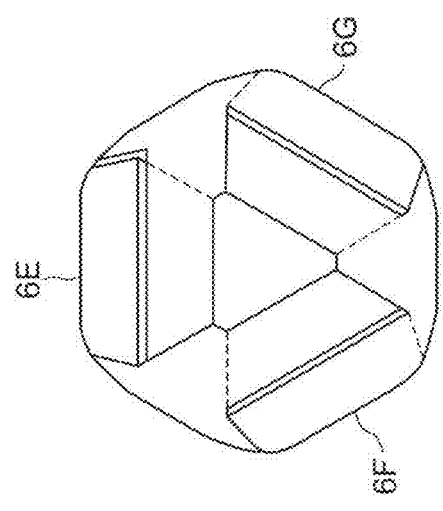
FIGS. 5A to 5D include schematic views each illustrating an example of grip parts according to an embodiment.
Figure 5B:
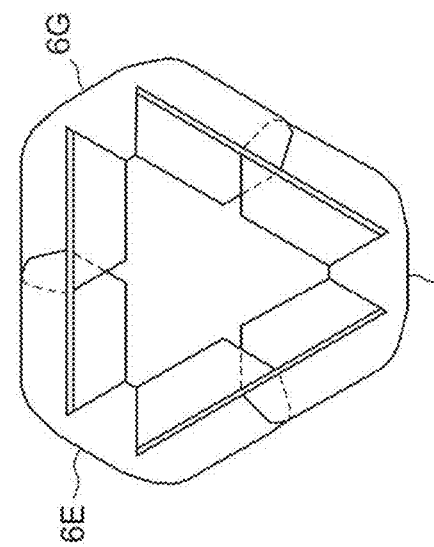
Figure 5C:
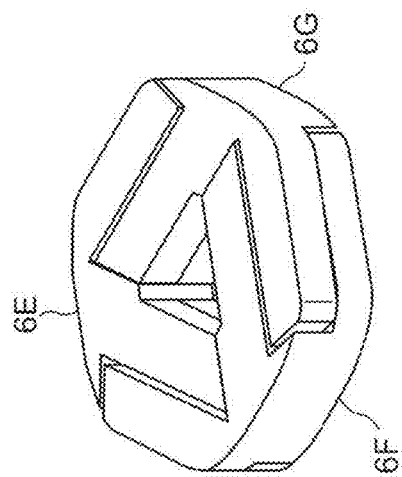
Figure 5D:
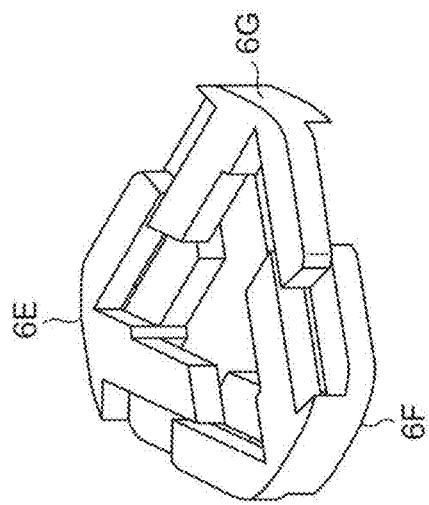

Here, "with at least some of locking pieces disengaged" means that, although the locking members 3 are biased outward by the elastic members 5 included in the cap 1 (the cap 1A or cap 1B) and locked to the inner circumferential surface of the opening of the article in press-contact, at this time, the locking pieces of the locking members 3 provided at the central end of the cap body 2 (the cap body 2A or the cap body 2B) are not completely engaged with each other (e.g., the state illustrated in FIGS. 5A and 5B), and at least some of the locking pieces are disengaged from each other so that the locking pieces are separated from each other (a loose engagement state) (the state illustrated in FIGS. 5C and 5D). As described above, this state is a state in which at least some of the locking pieces of the locking members 3 are disengaged from each other so that the locking pieces are separated from each other.

With this configuration, when the cap 1A is attached to the tubular part using the locking members 3A, 3B, 3C, and 3D, the cap 1A is inserted into the opening of the article by engaging the locking pieces of the locking members 3A, 3B, 3C, and 3D with each other, the locking members 3A, 3B, 3C, and 3D are pushed outward due to disengagement thereof after the insertion, the locking members are in press-contact with the inner circumferential surface of the opening of the article, and thereby the cap 1A can be fixed to the article. Accordingly, the cap body of the cap 1A can be removed from the tubular part by gripping any two locking members among the locking members 3A, 3B, 3C, and 3D, that is, two arbitrary points, on an outer circumference of the knob 9A formed by engaging (combining) grip parts 6 of the locking members 3A, 3B, 3C, and 3D to perform a pushing operation to unlock the locking members that have been in press-contact with the inner circumferential surface of the opening of the article, and therefore convenience can be improved.

Particularly, in a case where the cap is used as a lens cap of a camera, or the like, a user cannot easily see his or her hand when attempting to remove the cap while holding the camera, and thus needs to find a place to pinch, but according to the cap 1A, it is possible to remove the cap 1A by pinching two arbitrary points in 360 degrees around the knob 9A configured by engaging the grip parts 6 of the locking members 3A, 3B, 3C, and 3D, and therefore convenience can be improved.

In addition, the cap 1A may be provided with a pillar at the center of the support member 4 and a circular flange that is substantially the same as or slightly smaller than the circular opening 10A of the cap body 2A on the pillar. With this configuration, since the flange can cover a part of the engagement portion of the locking pieces of the locking members 3A, 3B, 3C, and 3D, the cap 1A can have a better appearance.

Figure 1B:
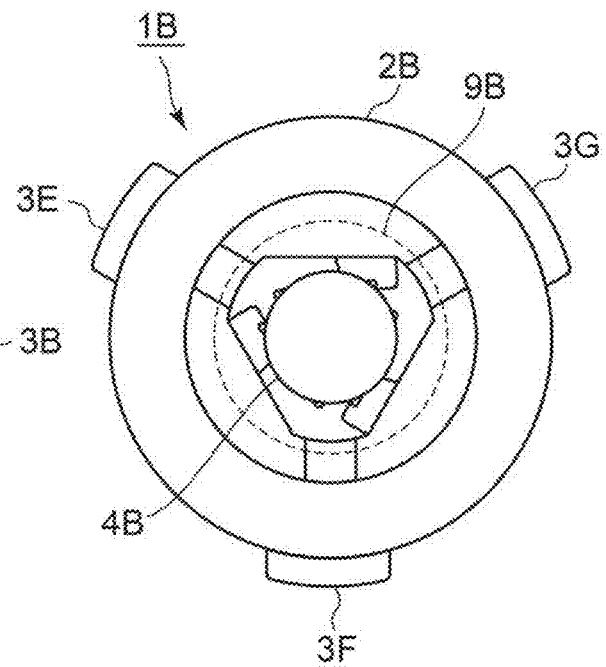
FIG. 1B is a plan view illustrating an example of a cap 1 according to a second embodiment.
Figure 1C:
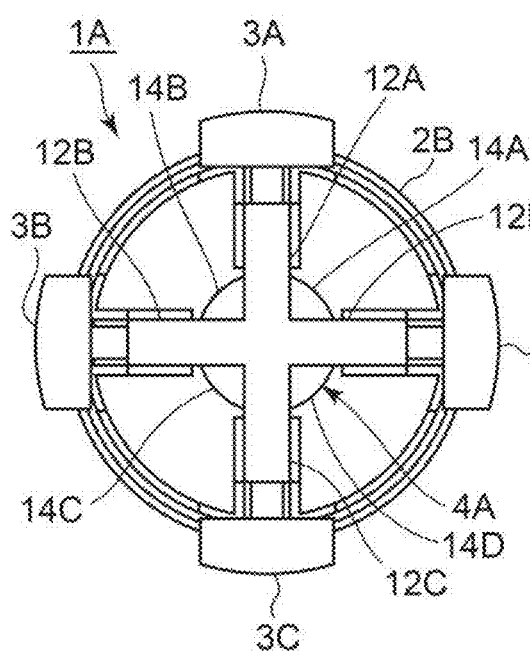
FIG. 1C is a bottom view illustrating an example of the cap 1 according to the first embodiment.

FIG. 1C is a bottom view illustrating the cap 1A according to the first embodiment. The cap 1A may have, for example, the support member 4A having two or more groove parts extending outward from the center at equal angles. The cap 1A may have the support member 4A specifically having four groove parts 12A, 12B, 12C, and 12D extending outward from the center at equal angles as illustrated in, for example, FIG. 1C. The groove parts will be described below in the example of a support member 4B of a second embodiment using FIGS. 6A to 6C.

The support member 4A may specifically have the four rectangular box-shaped groove parts 12A, 12B, 12C, and 12D extending outward from the center at the equal angles, for example, according to the disposition of the locking members 3A, 3B, 3C, and 3D to support the locking members as illustrated in FIG. 1C. The groove parts 12A, 12B, 12C, and 12D may be set to meet at the center to form a cross shape as illustrated in FIG. 1C. A length of the groove parts 12A, 12B, 12C, and 12D in a longitudinal direction may be formed to be shorter than a radius of the cap body 2A.

The support member 4A may have fan-shaped flanges 14A, 14B, 14C, and 14D connecting the groove parts 12A, 12B, 12C, and 12D together as illustrated in FIG. 1C. The support member 4A may fix the fan-shaped flanges to the circular opening of the cap body 2A, for example, by fitting the flanges to the opening.

The cap body 2A may have one or more side walls along an outer circumference as illustrated in FIG. 1C. The cap body 2A may specifically have two side walls such as, for example, an outer side wall and an inner side wall, the outer side wall may be formed in substantially the same shape as and come in contact with an inner circumferential surface of a side of the tubular part, and the inner side wall may be formed to be slightly smaller than the outer side wall having a higher height than the outer side wall. Although the side walls need to have gaps through which the locking members 3A, 3B, 3C, and 3D pass at the locations at which the locking members 3A, 3B, 3C, and 3D are disposed to come in press-contact with the inner circumferential surface of the opening of the article, the gaps may be provided at lower ends of the outer side wall and the inner side wall or in the middle between upper ends and lower ends of the outer side wall and the inner side wall.

FIG. 2A is a bottom view for describing the cap body 2A according to the first embodiment. The cap body 2A has the circular opening 10A at the center and four rectangular openings 11A, 11B, 11C, and 11D extending outward from the circular opening at equal angles as illustrated in FIG. 2A.

Figure 2B:
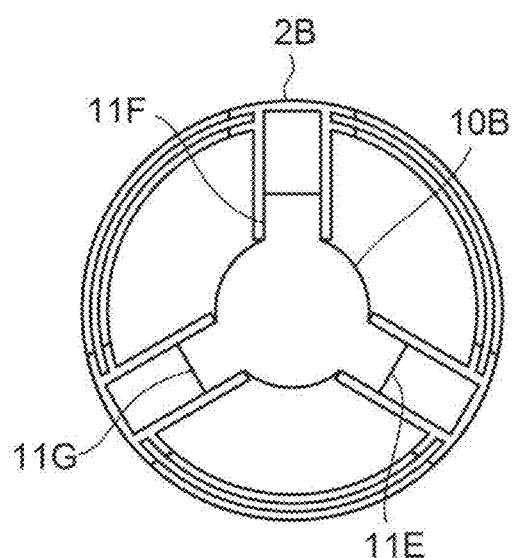
FIG. 2B is a bottom view illustrating an example of a cap body 2 according to the second embodiment.
Figure 2C:
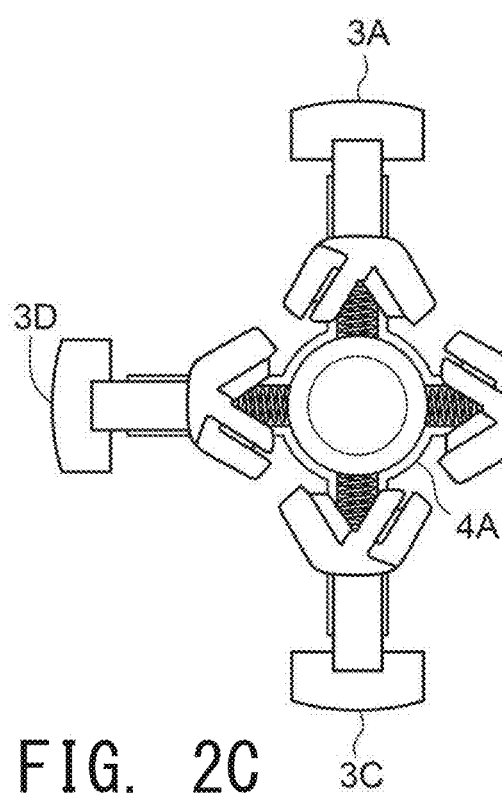
FIG. 2C is a plan view illustrating an example of locking members 3 and a support member 4 according to the first embodiment.

FIG. 2C is a plan view for describing the locking members 3A, 3B, 3C, and 3D, and the support member 4 according to the first embodiment. Some of the locking members 3A, 3B, 3C, and 3D are fitted to press the elastic members installed in the four groove parts 12A, 12B, 12C, and 12D extending outward from the center (at the same position of the center of the cap body 2A) of the support member 4 at the equal angles and are slidably attached as illustrated in FIG. 2C. Here, "Some of the locking members 3A, 3B, 3C, and 3D" refers to rectangular projections formed on attachment part 8 side (lower side) of a slide part 7 illustrated in the bottom view, the left side view, and the right side view of FIG. 3A. This configuration will be described later using FIG. 3A.

One ends (the grip parts 6) of the locking members 3A, 3B, 3C, and 3D may form two sides of a substantial triangle gradually widening toward the center of the support member 4 (the center at the same position as the center of the cap body 2A) as illustrated in FIG. 2C. These two sides of the substantial triangle may be disposed to surround the pillar of the support member 4. The locking members 3A, 3B, 3C, and 3D are slidably engaged with the other locking members on both sides, can be disengaged from each other by sliding the locking member inward toward the center and pushing the other locking member inward as illustrated in FIG. 2C, and thus a convenient cap can be provided.

Figure 3A:
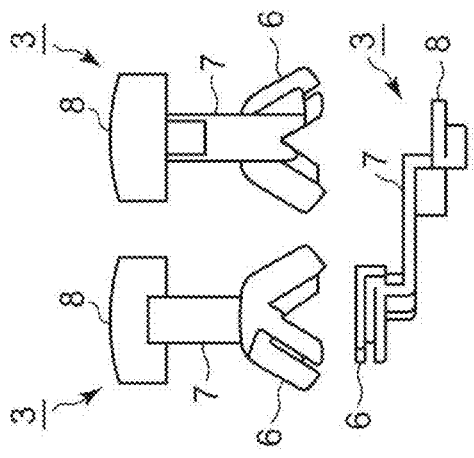
FIG. 3A includes a plan view, a bottom view, a right side surface view, and a left side surface view illustrating an example of the locking members 3 according to the first embodiment.

FIG. 3A includes a plan view (upper left), a bottom view (upper right), a left side surface view (lower left), and a right side surface view (lower right) for describing the locking members 3 according to the first embodiment.

As illustrated in FIG. 3A, each locking member 3 is constituted by the grip parts 6, the slide part 7, and the attachment part 8. The grip parts 6 are provided at one end of the slide part 7 in the longitudinal direction, and the attachment part 8 is provided at the other end of the slide part 7 as illustrated in FIG. 3A.

The slide part 7 is a part of each locking member 3, is provided at the center of the locking member 3 and is a part for enabling the locking members 3 to be capable of sliding inward and outward from the center of the cap body. Although the slide part 7 slides along the groove part of the support member 4, as illustrated in the bottom view, the left side view, and the right side view of FIG. 3A, the slide part 7 may have a rectangular projection formed to match the groove part as if the slide part were fitted into the groove part on the lower side of the attachment part 8 side. When the projection presses the elastic members 5 installed in the groove parts, the locking members 3 slide inward and the locking members 3 engage with each other, and the locking members 3 slide outward with the release of the pressure to disengage the locking members 3, the elastic members 5 bias the projections, and thus the locking members can come in press-contact with the inner circumferential surface of the opening of the article to which the cap is to be attached using the attachment part 8.

The grip parts 6 are parts of the locking members 3 provided at one ends of the locking members 3, are parts for gripping the cap 1A (pinching the cap with fingers, etc.) as the knob 9 when the cap is attached to and removed from the tubular part as illustrated in FIG. 3A, and are three or more grip parts 6 engaged with each other. Each of the grip parts 6 may have a first upper locking piece and a second upper locking piece forming two sides of a substantial triangle gradually widening to the center, and a first lower locking piece and a second lower locking piece disposed to form steps with the first upper locking piece and the second upper locking piece respectively in the same direction.

Specifically, each of the grip parts 6 may have the first upper locking piece and the first lower locking piece, for example, on the left side of an axis as which the slide part 7 serves and have the second upper locking piece and the second lower locking piece on the right side of the axis as illustrated in the plan view of FIG. 3A. A piece projecting in a substantial triangle may be provided on the left side of the vertex of a substantial triangle formed by the first upper locking piece and the second upper locking piece as illustrated in the plan view of FIG. 3A. Due to the projecting piece, when the locking piece of the grip part 6 of another locking member slides and engages in the gap formed on the left side of the first upper locking piece and the upper side of the first lower locking piece, the sliding can be stopped and held.

The attachment part 8 is a part of each of the locking members 3, provided at one end of the locking member 3, and is a part coming in press-contact with the inner circumferential surface of the opening of the article when the cap 1A is attached to the tubular part. The attachment part 8 may be formed to have a step as illustrated in the left side view and the right side view of FIG. 3A. With respect to the step, by matching the height difference of the step with the outer side wall and the inner side wall provided in the cap body 2A, the attachment part 8 can be fitted well to the cap body 2A.

Figure 3B:
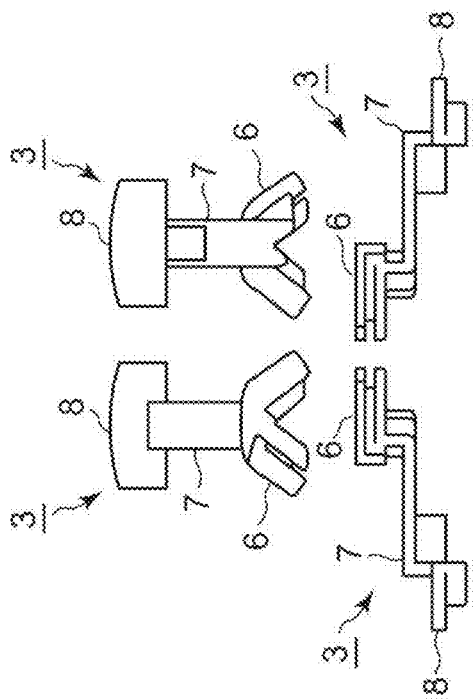
FIG. 3B includes a plan view, a bottom view, and a left side surface view illustrating an example of the locking member 3 according to the second embodiment.
Figure 3C:
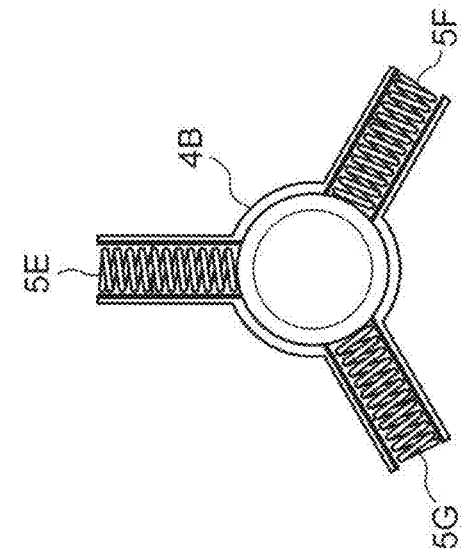
FIG. 3C is a plan view illustrating an example of the support member 4 and elastic members 5 according to the first embodiment.

FIG. 3C is a plan view for describing the support member 4 and the elastic members 5 according to the first embodiment.

The support member 4 is a part for supporting the locking members 3 from the back of the cap body 2A and installing the elastic members 5. The support member 4 may have, for example, a circular flange at the center and two or more groove parts extending outward from the center of the circular flange (the center of the cap body 2A) at equal angles as illustrated in FIG. 3C. The support member 4 may have, for example, four groove parts as illustrated in FIG. 3C.

The elastic members 5 are members for biasing the locking members 3 outward to help the locking members 3 be attached to an article. Further, although the elastic members 5 are exemplified as separate members from the support member 4 in the present embodiment, the elastic members 5 and the support member 4 may be integrally molded. As illustrated in FIG. 3C, the elastic members 5 may include an elastic member 5A, an elastic member 5B, an elastic member 5C, and an elastic member 5D, may be installed in the groove parts of the support member 4, and may bias the locking members 3 outward from the center. The locking members 3 come in press-contact with the inner circumferential surface of the cap body due to the biasing and come in press-contact with an inner circumferential surface of an article to which the cap is to be attached, and thus are locked to the cap body. With this configuration, the locking members 3 can be attached to be capable of sliding on the support member 4 and can be evenly in press-contact with the article having the opening from the center of the circular flange (the center of the cap body 2A).

Second Embodiment

While an example in which the four locking members 3 engage with each other and the cap 1A is attached to an article at four points has been described in the first embodiment, in a second embodiment, an example in which three locking members 3 engage with each other and a cap 1B is attached to an article at three points will be described. Description will be provided with reference to drawings. Further, at least two locking members 3 of the cap according to the invention of the present application can be locked, and two or more locking members 3 engage with each other and can be locked so that the cap is attached to an article at two or more points. Although a cap of the related art is locked only at two points, it is desirable for the cap according to the present invention to have three or more locking points from the viewpoint of locking stability, and it is more advantageous for the number of locking members 3 (locking points) to be three (three points) than two (two points) in view of realization of stable locking.

FIG. 1B is a plan view for describing the cap 1B according to the second embodiment of the present invention. Since configurations of the present embodiment are similar to those of the first embodiment other than the number of the locking members 3 (three vs. four) and attachment locations (three points vs. four points), description thereof will be omitted.

Figure 1D:
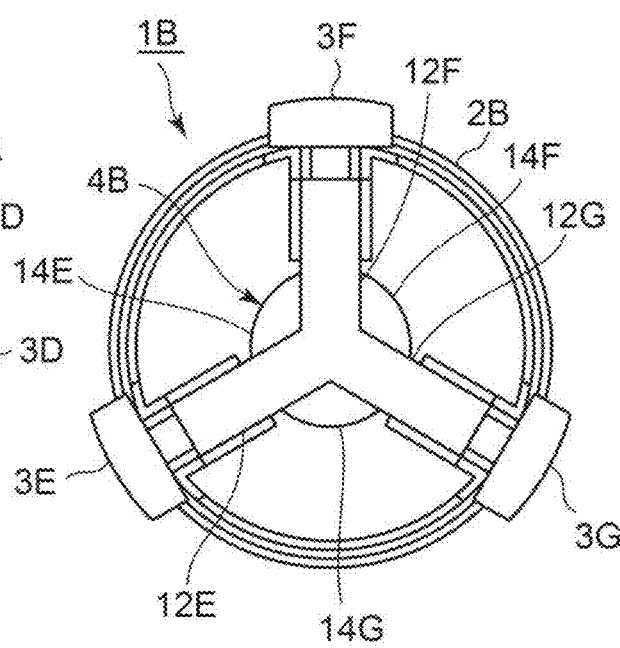
FIG. 1D is a bottom view illustrating an example of the cap 1 according to the second embodiment.

FIG. 1D is a bottom view for describing the cap 1B according to the second embodiment. Since configurations of the present embodiment are similar to those of the first embodiment other than the number of the locking members 3 (three vs. four) and attachment locations (three points vs. four points), description thereof will be omitted.

FIG. 2B is a bottom view for describing a cap body 2B according to the second embodiment. Since configurations of the present embodiment are similar to those of the first embodiment other than the number of rectangular openings (three vs. four), description thereof will be omitted.

Figure 2D:
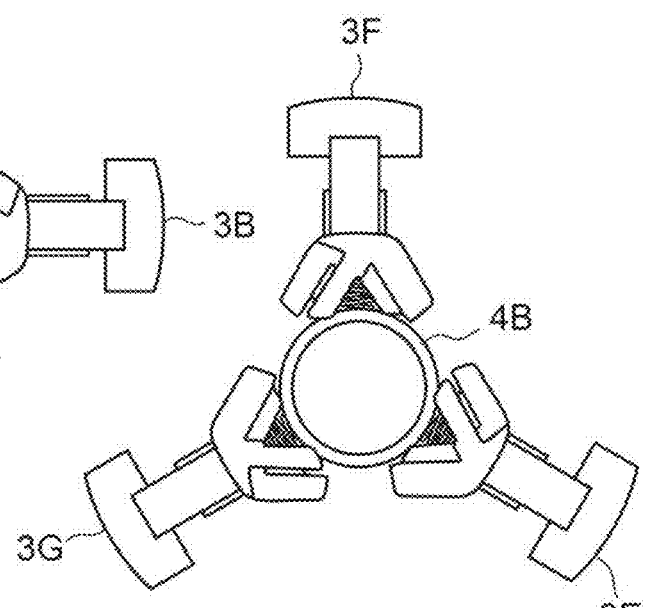
FIG. 2D is a plan view illustrating an example of locking members 3 and a support member 4 according to the second embodiment.

FIG. 2D is a plan view for describing locking members 3A, 3B, and 3C and a support member 4 according to the second embodiment. Since configurations of the present embodiment are similar to those of the first embodiment other than the number of locking members 3 (three vs. four) and the number of rectangular box-shaped groove parts (three vs. four) of the support member 4, description thereof will be omitted.

FIG. 3B includes a plan view (upper left), a bottom view (upper right), and a left side surface view (lower) for describing the locking members 3 according to the second embodiment. Since configurations of the present embodiment are similar to those of the first embodiment other than the number of locking members 3 (three vs. four), description thereof will be omitted.

Figure 3D:
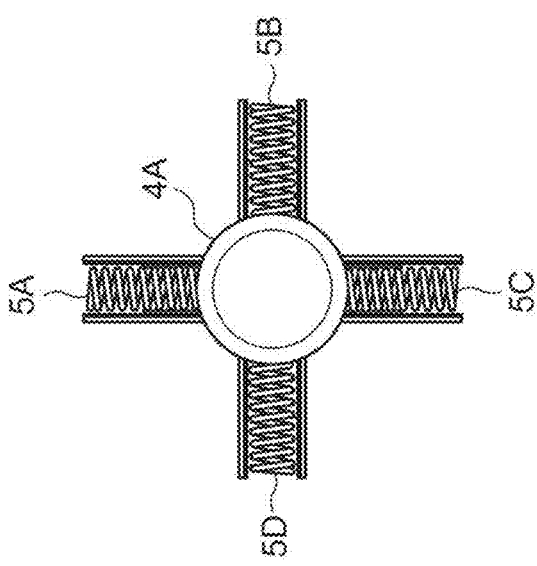
FIG. 3D is a plan view illustrating an example of the support member 4 and elastic members 5 according to the second embodiment.

FIG. 3D is a plan view for describing the support member 4 and the elastic members 5 according to the second embodiment. Since configurations of the present embodiment are similar to those of the first embodiment other than the number of rectangular box-shaped groove parts of the support member 4 and the number of elastic members (three vs. four), description thereof will be omitted.

FIGS. 5A to 5D include schematic views for each describing an example of a configuration of the grip parts 6 according to the second embodiment. Further, a basic configuration of the grip parts 6 is the same as that of the first embodiment except that the number of grip parts is different.

As illustrated in FIGS. 5A to 5D, the grip parts 6 are constituted by two or more (three) grip parts including a grip part 6E, a grip part 6F, and a grip part 6G. In other words, the grip parts 6 are configured as gears of the center of the cap 1B.

FIG. 5A is a perspective view illustrating a state in which the grip part 6E engages with the grip part 6F and the grip part 6G serving as grip parts of the other locking members on both sides. FIG. 5B is a plan view illustrating a state in which the grip part 6E engages with the grip part 6F and the grip part 6G serving as grip parts of the other locking members on both sides (a state in which a volume of the gears at the center is reduced). FIG. 5C is a perspective view illustrating a state in which at least part of the engagement of the grip part 6E with the grip part 6F and the grip part 6G serving as grip parts of the other locking members on both sides is released (a state in which the gears at the center are opened). FIG. 5D is a plan view illustrating a state in which at least part of the engagement of the grip part 6E with the grip part 6F and the grip part 6G serving as grip parts of the other locking members on both sides is released.

As illustrated in FIGS. 5A to 5D, for example, when the grip part 6E and the grip part 6F are pinched and pushed with fingers and slide toward the center (the center of a substantial triangle surrounded by the grip part 6E, the grip part 6F, and the grip part 6G (the center of the cap body 2B)), the grip parts 6 are pushed inward toward the center (the center of the cap body 2B) while the first lower locking piece of the grip part 6E gradually comes in press-contact with the second lower locking piece of the grip part 6F, and the second upper locking piece of the grip part 6F gradually comes in press-contact with the first upper locking piece of the grip part 6F from tips. Further, the grip part 6E, the grip part 6F, and the grip part 6G engage (combine) with each other and form a knob 9B as illustrated in FIGS. 5A to 5D.

At this time, since a force component applied in a direction perpendicular to the direction of the axis passing through the vertex of the substantial triangle formed by the grip part 6G and the center is offset due to a force component applied by the grip part 6E and the grip part 6F in the reverse direction, while a force component applied in the direction of the axis passing through the vertex of the substantial triangle formed by the grip part 6G and the center is the same as the direction of a force component applied from the grip part 6E and the grip part 6F, a force applied by the grip part 6E and the grip part 6F to the grip part 6G at the time of press-contact is combined and pushes the grip part 6G inward toward the center.

As described above, in the cap 1B, by pinching arbitrary points of any two grip parts among the grip part 6E, the grip part 6F, and the grip part 6G with fingers and pushing them, all of the grip parts can be caused to slide toward the center in conjunction with the other grip part as illustrated in FIGS. 5A to 5D. Further, also in the cap 1A, by pinching arbitrary points of any two grip parts among the grip part 6E, the grip part 6F, the grip part 6G, and the grip part 6D with fingers and pushing them, all of the grip parts can be caused to slide toward the center in conjunction with the other grip part.

When the grip part 6E, the grip part 6F, and the grip part 6G are pushed inward toward the center, the force is transmitted to the slide 7 connected to a lower part of the grip parts 6, the slide 7 applies a force opposite to a biasing force of the elastic members 5 to the elastic members 5, and therefore, all of the locking members 3 slide inward toward the center.

With the above-described configuration, the grip parts 6 slidably engage with the other grip parts 6 on both sides and slide inward toward the center, the other grip parts 6 are thus pushed inward, locking of the cap 1B to the article is released, the cap body can thus be removed from the article, and therefore a convenient cap can be provided.

FIGS. 6A to 6C include schematic views for each describing an example of a configuration of the support member 4 according to the second embodiment. Further, a basic configuration of the support member 4 is the same as that of the first embodiment except that the number of groove parts is different.

The support member 4 has three groove parts 12E, 12F, and 12G extending outward from the center at equal angles as illustrated in FIGS. 6A to 6C. In addition, the support member 4 may have a pillar 15B at the center and have fan-shaped flanges 14E, 14F, and 14G to connect a substantially circular flange 13B to the groove parts substantially at a center portion on the pillar. By fitting the fan-shaped flanges 14E, 14F, and 14G to a circular opening 10B of the cap body 2B, the support member 4 may be attached to the cap body 2B.

Each of the three groove parts 12E, 12F, and 12G of the support member 4 is configured to form a substantially rectangular groove with two side surfaces and a bottom surface as illustrated in FIGS. 6A to 6C. The groove parts 12E, 12F, and 12G may be formed such that a length of the bottom surface in the longitudinal direction is shorter than a length of the side surfaces in the longitudinal direction. With this configuration, wear caused by friction of the groove parts with the attachment part 8 of the locking members 3 can be prevented.

Figure 7:
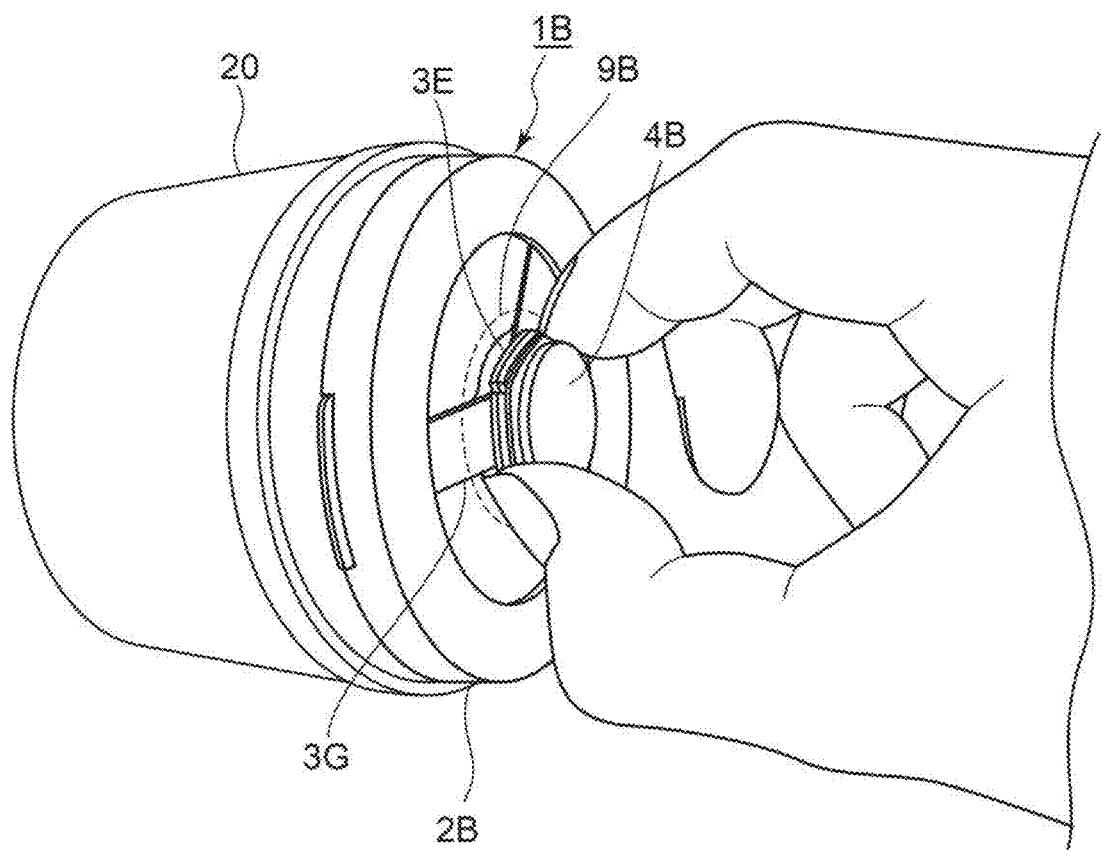
FIG. 7 is a schematic view illustrating an attachment example of a cap according to an embodiment.

FIG. 7 is a schematic view illustrating an example in which the cap 1B according to the second embodiment is attached to the tubular part 20. Further, a basic configuration of the cap is the same as the cap 1A of the first embodiment except that the number of locking members and the like are different. This is an example in which an article to which the cab 1B is attached is assumed to be the tubular part.

As illustrated in FIG. 7, when the cap 1B is attached to the tubular part 20, by pinching, with fingers, two arbitrary points of the knob 9B configured by the engaged (combined) grip parts 6 of the locking members 3E, 3F, and 3G and pushing the members, the locking members 3E, 3F, and 3G are set not to project outward from the cap body 2B, fitted into and attached to the opening of the tubular part 20.

Figure 8A:
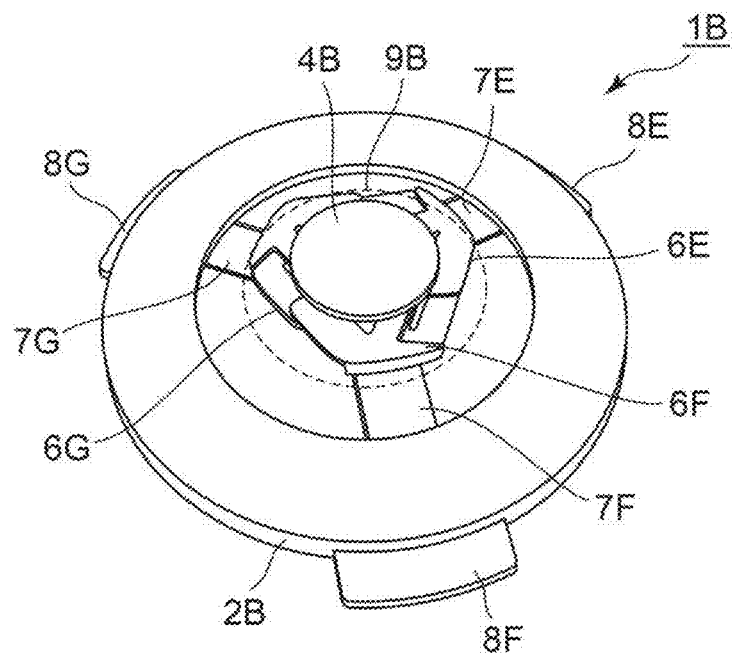
FIG. 8A is a perspective view of the cap 1 according to the second embodiment in the removed state.
Figure 8B:
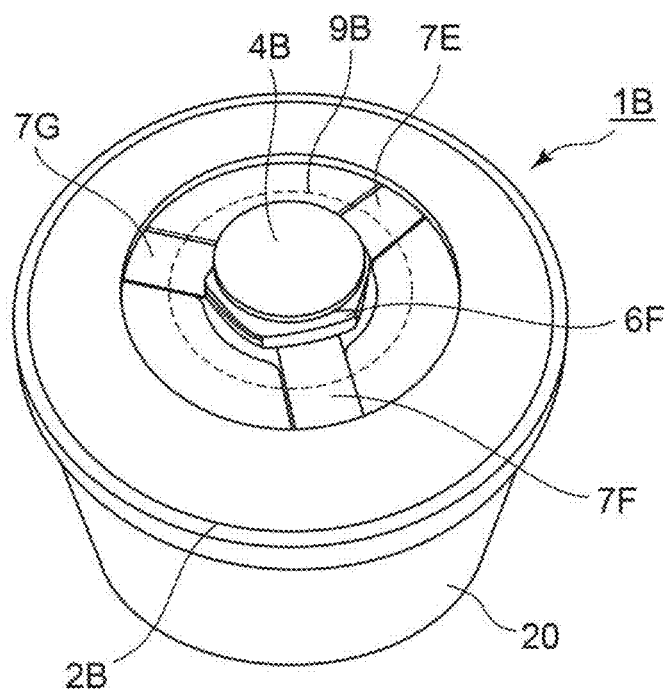
FIG. 8B is a perspective view of the cap 1 according to the second embodiment attached to an article.

FIGS. 8A and 8B include perspective views each taken when the cap 1B according to the second embodiment is removed from and attached to an article. Further, a basic configuration of the cap is the same as the cap 1A of the first embodiment except that the number of locking members and the like are different.

FIG. 8A illustrates a state in which the cap 1B is removed from an article. As illustrated in FIG. 8A, in the state in which the cap 1B is removed, at least some of the grip parts 6E, 6F, and 6G of the locking members 3 are disengaged such that the parts are separated. This configuration can be realized by, for example, the slide parts 7E, 7F, and 7G of the locking members 3 being locked by a side wall of the cap body 2B although the locking members 3 are biased outward by the elastic members 5.

FIG. 8B illustrates a state in which the cap 1B is attached to the article. As illustrated in FIG. 8B, in the state in which the cap 1B is attached, the grip parts 6E, 6F, and 6G of the locking members 3 completely engage with each other. At this time, the grip parts 6E, 6F, and 6G of the locking members 3 are biased outward by the elastic members 5, come in press-contact with an inner circumferential surface of the tubular part 20, and thereby are locked.

Common Features

Figure 4A:
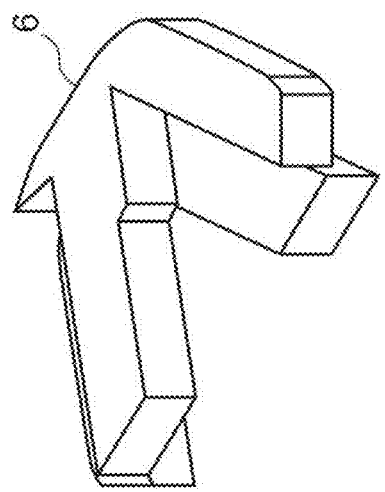
FIGS. 4A to 4C include schematic views each illustrating an example of grip parts (locking pieces) according to an embodiment.
Figure 4B:
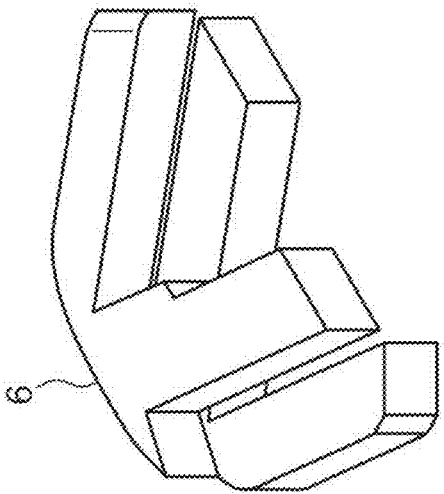
Figure 4C:
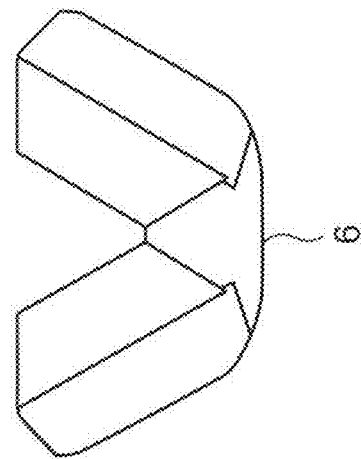

FIGS. 4A to 4C include schematic views for each describing an example of a configuration of locking pieces of the grip parts 6 according to an embodiment. This configuration is an example of a common configuration for First Embodiment and second Embodiment of the present invention.

As illustrated in FIGS. 4A to 4C, each of the grip parts 6 of the locking members 3 has the first upper locking piece and the second upper locking piece forming two sides of a triangle gradually expanding toward the center of the cap body 2A, and the first lower locking piece and the second lower locking piece disposed to form steps with the first upper locking piece and the second upper locking piece respectively in the same direction. The grip parts 6 of the locking members 3 cause the locking pieces of the other locking members 3 on both sides to engage with upper and lower gaps generated by the steps, and then the locking members 3 slide inward toward the center of the cap body 2A and push the other locking members inward. As illustrated in FIGS. 4A to 4C, the first upper locking piece, the second upper locking piece, the first lower locking piece, and the second lower locking piece may be formed in, for example, a substantial rectangular shape (a substantial quadrangle).

Each of the grip parts 6 of the locking members 3 may further have a substantially triangular projecting piece on the left side of the vertex outside the substantial triangle formed by the first upper locking piece and the second upper locking piece as illustrated in FIGS. 4A to 4C. This projecting piece can stop sliding of the locking piece of the grip part 6 of another locking member when the locking piece slides into and engages with the gap generated on the left side of the first upper locking piece and the upper side of the first lower locking piece and thus can hold the locking piece.

Each of the grip parts 6 of the locking members 3 may have a step on the left side of the vertex inside the substantial triangle formed by the first upper locking piece and the second upper locking piece (on the vertex side inside the first upper locking piece) as illustrated in FIGS. 4A to 4C. This step can stop sliding of the locking piece of the grip part 6 of another locking member when the locking piece slides into and engages with the gap generated on the left side of the second upper locking piece and the upper side of the second lower locking piece and thus can hold the locking piece.

Although there is a space between the first upper locking piece and the second upper locking piece, and the first lower locking piece and the second lower locking piece of the grip part 6 of the locking members 3 in the example illustrated in FIG. 4B for the sake of simple description, a step part may be provided without the space, thus the first upper locking piece and the first lower locking piece may be connected in a bent hook shape via the step part, and the second upper locking piece and the second lower locking piece may be connected in a bent hook shape via the step part likewise.

FIG. 9 is a flowchart showing an example of an assembly procedure of a cap 1 according to an embodiment of the present invention.

The elastic members 5 are attached to the support member 4 (step S10) as shown in FIG. 9. Specifically, the elastic members 5 are installed in each of the groove parts 12 of the support member 4. When the elastic members 5 are installed in the groove parts 12, the elastic members 5 are put into and installed in the grooves of the groove parts 12 with one ends of the elastic members 5 in the longitudinal direction in contact with the pillar 15 and the other ends released.

The locking members 3 are attached to the support member 4 with the elastic members 5 attached thereto (step S11). Specifically, the locking members 3 are placed in each of the groove parts 12 of the support member 4 with the elastic members 5 installed from above the elastic members 5 (from a side opposite to the support member 4). At the time of the placement, the rectangular projections formed below the slide part 7 of the locking members 3 come in contact with the released ends of the elastic members 5 such that the ends are caught. After the placement, the grip parts 6 of the locking members 3 are pinched with fingers and pushed inward, then the locking members 3 are caused to slide inward along the groove parts 12 of the support member 4 to resist a biasing force of the elastic members 5 outward, and thereby the locking members 3 are fixed with the grip parts 6 of the locking members 3 engaged with each other. At this time, specifically, the projections of the locking members 3 press the elastic members 5 to resist the biasing force thereof, and thereby the locking members 3 are caused to slide inward.

The cap body 2 is attached to the support member 4 with the locking members 3 attached thereto (step 12). Specifically, in the state in which the grip parts 6 of the locking members 3 are engaged with each other and fixed to the support member 4, a part of the support member 4 (the fan-shaped flange part 14 and the slide part 7 of the locking members 3) is fitted to the circular opening 10 and an rectangular opening 11 of the cap body 2, a push operation is released in the fitting state, thereby the engagement of the grip parts 6 of the locking members 3 is partly released, and thereby the slide part 7 of the locking members 3 is locked to a side wall of the cap body 2 and attached.

Further, with respect to the cap 1A illustrated in FIGS. 1A and 1C, the example in which the locking members 3A, 3B, 3C, and 3D projecting in four directions are provided, the locking members are set to be in press-contact with the inner circumferential surface (inner wall) of the article at four points, and thereby the cap is attached to the article is illustrated. In addition, likewise, with respect to the cap 1B illustrated in FIGS. 1B and 1D, the example in which the locking members 3E, 3F, and 3G projecting in three directions are provided, the locking members are set to be in press-contact with the inner circumferential surface (inner wall) of the article at three points, and thereby the cap is attached to the article is illustrated. Although the cap can be stably attached to the article by providing a plurality of locking members, the number of locking members may be one. In this case, a cap may be configured as illustrated in FIG. 10A and FIG. 10B. FIG. 10A illustrates an example in which only the locking member 3A is provided in the cap 1A, and only the locking member 3A is in press-contact with an inner wall of an article. Similarly, FIG. 10B illustrates an example in which only the locking member 3F is provided in the cap 1B, and only the locking member 3F is in press-contact with an inner wall of an article. In this case, in the cap 1B, a side surface portion on the side opposite to the locking member 3F (the shaded part 101 illustrated in FIG. 10C) can also come in press-contact with an inner circumferential surface (inner wall) of the article along the projection of the locking member 3F, and thus the cap can be in press-contact with and attached to the article at two points. By reducing the number of locking members, the number of parts of the cap can be reduced, and therefore manufacturing costs can be reduced more than in a case where a plurality of locking members are provided.

In addition, while one locking member is sufficient, a plurality of the grip part 6 needs to be combined. At this time, the number of members combined as the grip parts 6 is desirably an odd number rather than an even number from the viewpoint of moment. In other words, the grip parts 6 are easily pinched if the grip parts 6 are configured to be formed by combining an odd number of members.

REFERENCE SIGNS LIST

1 Cap
2 Cap body
3 Locking member
4 Support member
5 Elastic member
6 Grip part
7 Slide part
8 Attachment part

The invention claimed is:

1. A cap that is attached to an article having an opening, the cap comprising:
a cap body; and
at least three or more locking members that are attached to be capable of sliding inward and outward from a center of the cap body and comes in press-contact with an inner circumferential surface of the article to lock the cap body,
wherein the locking members slidably engage with other locking members on both sides, slides inward toward the center, thereby pushing the other locking members inward, and releases the lock,
wherein the cap body has a circular opening at the center and three or more rectangular openings extending outward from the circular opening at equal angels, and
wherein the locking members project from the rectangular openings and come in press-contact with the inner circumferential surface of the article.

2. The cap according to claim 1, comprising:
a plurality of the locking members,
wherein the locking members are disposed at equal angles around the center of the cap body.

3. The cap according to claim 2, comprising:
a support member having three or more groove parts extending outward from the center at equal angles,
wherein at least some of the locking members are fitted to any one of the three or more groove parts and slidably attached.

4. The cap according to claim 3, comprising:
an elastic member that is installed in the groove parts and biases the locking members outward from the center,
wherein the locking members come in press-contact with an inner circumferential surface of the article due to the biasing and lock the cap body.

5. The cap according claim 1,
wherein each of the locking members has a first upper locking piece and a second upper locking piece forming two sides of a triangle gradually expanding toward the center, and a first lower locking piece and a second lower locking piece disposed to form steps with the first upper locking piece and the second upper locking piece respectively in the same direction, and causes locking pieces of the other locking members on both sides to engage with upper and lower gaps generated by the steps, and then the locking member slides inward toward the center and pushes the other locking members inward.

6. The cap according to claim 1,
wherein the cap is a lens cap mounted on a lens barrel.

7. The cap according to claim 6,
wherein the grip part is exposed from the circular opening.

8. The cap according to claim 1,
wherein each of the locking members has a grip member at an end on a side on which the locking member engages with another locking member,
wherein a grip part is formed by the grip member by each of the locking members engaging with another locking member, and
wherein all of the locking members are moved inward by pinching the grip part.

9. A locking mechanism for locking a plate-shaped member to an opening of an article having the opening, the locking mechanism comprising:
a plate-shaped member body; and
at least three or more locking members that are slidably attached inward and outward and come in contact with an inner circumferential surface of the article to lock the member body,
wherein the locking members slidably engage with other locking members on both sides, slides inward the center, thereby push the other locking members inward, and release the lock,
wherein the member body has a circular opening at the center and three or more rectangular openings extending outward from the circular opening at equal angels, and
wherein the locking members project from the rectangular openings and come in press-contact with the inner circumferential surface of the article.

* * * * *